United States Patent [19]

Weiss et al.

[11] Patent Number: 5,282,600
[45] Date of Patent: Feb. 1, 1994

[54] UNIVERSAL QUICK CONNECT HANGER FOR SUSPENDING A LIGHTING SYSTEM

[75] Inventors: Yoram Weiss, Oakland; Robert A. Steinbeck, Castro Valley, both of Calif.

[73] Assignee: Peerless Lighting Corporation, Berkeley, Calif.

[21] Appl. No.: 771,008

[22] Filed: Sep. 30, 1991

[51] Int. Cl.$^5$ ............................................. F21V 21/00
[52] U.S. Cl. ................................. 248/343; 362/404
[58] Field of Search ............. 248/343, 342, 344, 324; 362/404

[56] References Cited

U.S. PATENT DOCUMENTS

| | | | |
|---|---|---|---|
| 1,782,791 | 11/1930 | Nielsen | 248/343 |
| 2,249,331 | 7/1941 | Sachs | 248/343 |
| 2,467,639 | 4/1949 | Tornblom | 248/343 |
| 3,012,132 | 12/1961 | Rosenfield | 248/343 X |
| 3,190,604 | 6/1965 | Jorgensen et al. | 248/343 X |
| 3,589,660 | 6/1971 | Dunckel | |
| 3,621,235 | 11/1971 | Appleton | |
| 3,719,818 | 3/1973 | Porter | |

FOREIGN PATENT DOCUMENTS 433883  10/1967  Switzerland ................. 248/343

OTHER PUBLICATIONS

Peerless Catalog, *Mountings/Pendant Mounts*, 1976, 2 pages.

Primary Examiner—Alvin C. Chin-Shue
Attorney, Agent, or Firm—Donald L. Beeson

[57] ABSTRACT

A mounting device for hanging lighting fixtures from a ceiling. A quick connect hanger assembly having a universal design which is readily adapted to different suspension media. The assembly includes a suspension media adapter and a separate hanger bracket.

11 Claims, 9 Drawing Sheets

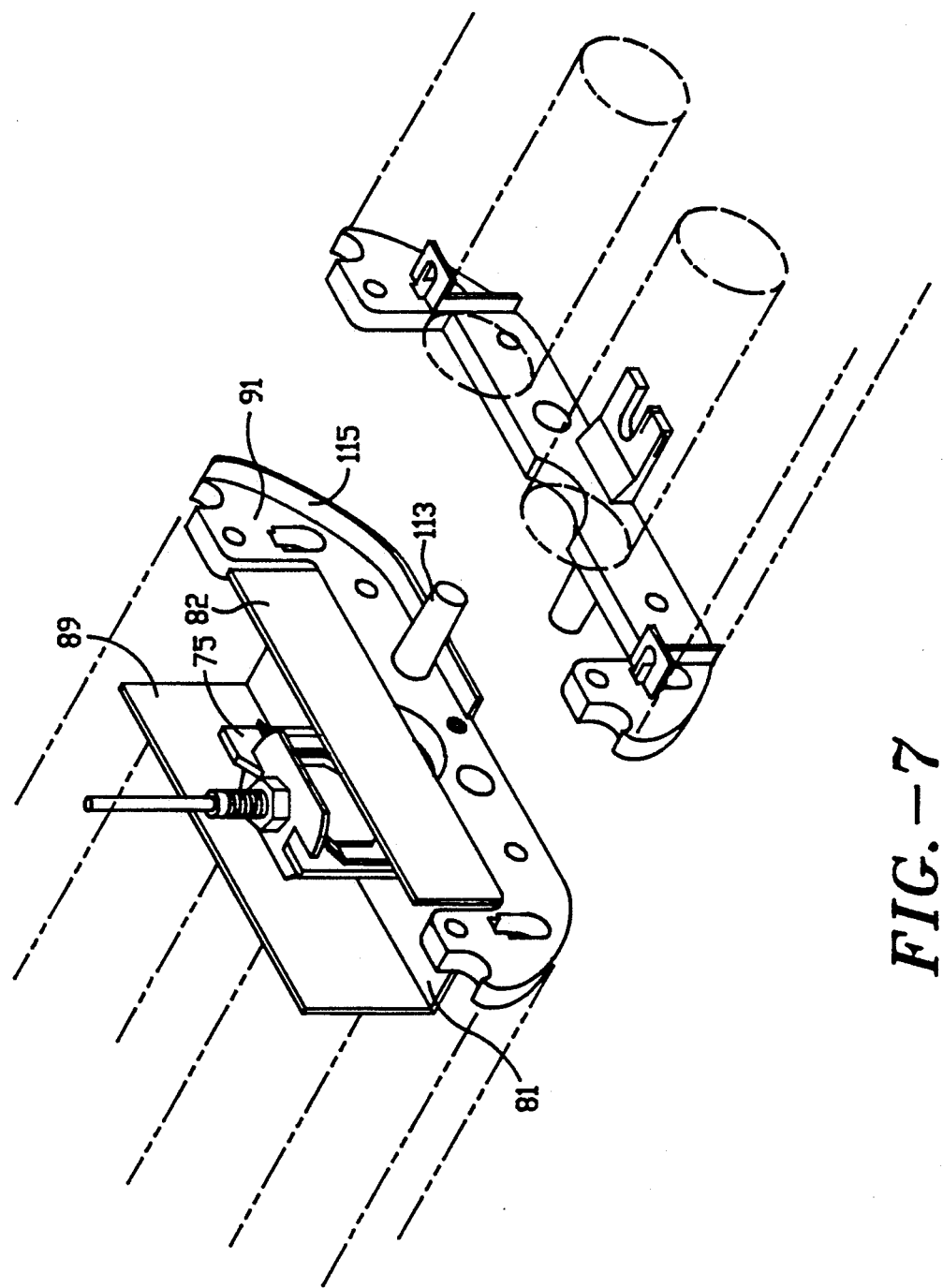
FIG.—7

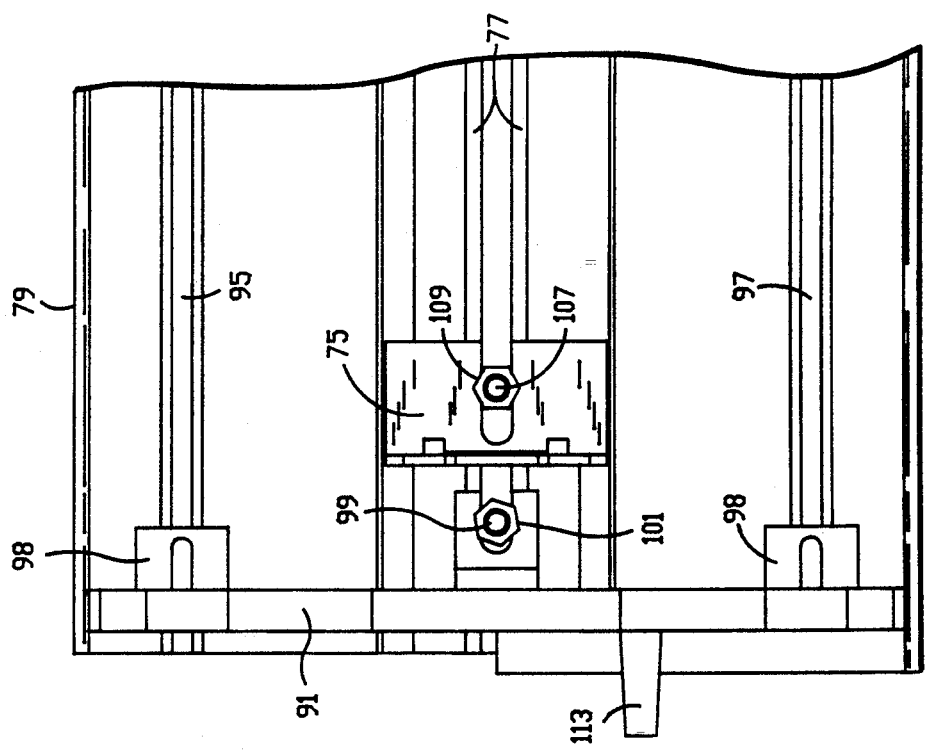
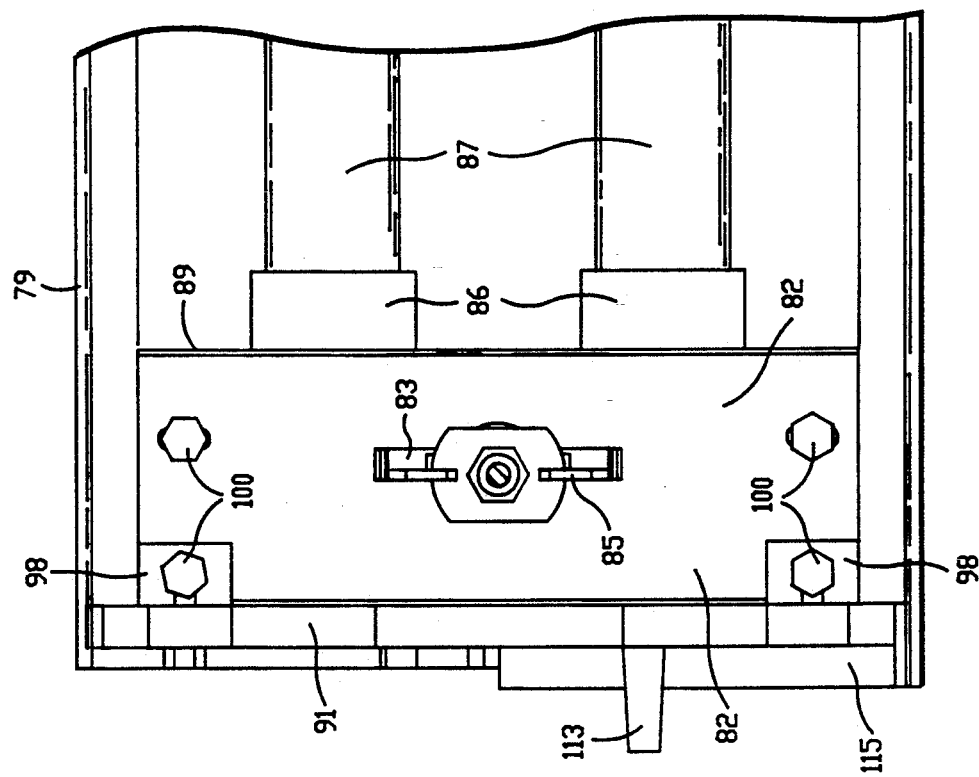

UNIVERSAL QUICK CONNECT HANGER FOR SUSPENDING A LIGHTING SYSTEM

BACKGROUND OF THE INVENTION

The present invention generally relates to architectural lighting and more particularly to hanger hardware used in connection with suspended lighting fixtures. The invention has particular application in the installation of linear lighting systems which may involve hundreds of feet of extruded linear fixture elements and connectors suspended from an overhead ceiling structure by one or more different types of suspension media such as rigid stems, swivel stems, and adjustable and nonadjustable cables.

Linear lighting systems are presently installed using hanger hardware that is specifically designed for the suspension media and the fixture elements and connectors to be used for a particular installation. Such hardware, which is needed to attach the suspension media to the linear system components at determined suspension points, include various types of steel brackets, extruded aluminum hangers, aluminum die cast parts and the like. Hanging a component of the lighting system might also include direct attachment of suspension media to the component's housing. In any case, each piece of hanger hardware is specific to a particular application resulting in relatively complicated specification requirements, increased installation time and complexity, and thus, added cost.

A further difficulty with conventional hanger hardware for suspended lighting systems is that once such a system is specified and built, it is difficult and costly, and at times a practical impossibility, to change to another type of suspension scheme. Thus, after specification, there is very little flexibility in terms of how the lighting system is suspended at the job site. Also, conventional suspension hardware does not readily permit suspension schemes which provide for anything other than standard suspension spacing or exact nominal spacing dimensions (which are typically 4', 8', 12', etc. suspension points); any non-standard suspension scheme could be achieved only at substantially greater costs.

The present invention overcomes the above-mentioned drawbacks of conventional suspension hardware by providing a quick connect hanger assembly having a universal design which is readily adapted to different suspension media and which can be used to suspend various components of a linear lighting system at different points within the system. The quick connect hanger of the present invention is easily installed and has a limited number of inexpensive parts which can be shipped to a job site in kit form at any time prior to or during installation, or after installation if the hanging scheme is to be modified. The hanger of the invention requires no pre-assembly or pre-measuring to exactly locate where hanger brackets are to be placed. Costs and delays associated with errors and misplaced components are virtually eliminated. Using the hanger of the invention, suspension media can be readily changed at the job site, even after the installation is completed, thus simplifying the specification process.

In addition to the above-mentioned flexibility and ease of installation, the quick connect hanger of the invention further provides suspension hardware which will effectively prevent dislodgement of the suspended system component from the hanger when the component is jarred, such as would occur during an earthquake.

SUMMARY OF THE INVENTION

Briefly, the hanger assembly of the invention includes a suspension media adapter adapted to be retained on the end of different suspension media such as the threaded end of a rigid stem, the ball end of a swivel stem, or the threaded stud end of an adjustable or nonadjustable cable. Also included is a separate hanger bracket which can be made to lockingly engage the suspension media adapter. As will be described, the hanger bracket is readily adapted to anchoring schemes which permit the hanger bracket to readily be affixed to an extruded linear fixture housing, either at the ends of the housing or at selected midpoints along the housing, or to various shaped connector components such as "L", "T", and "X" connectors. In one aspect of the invention an unique anchoring arrangement provides for installing the hanger bracket between lighting fixture elements by using joiner plates designed to capture and hold the hanger bracket.

In the illustrated embodiment, the suspension media adapter is comprised of a suspension washer having locking slots which permit the washer to lockingly engage the hanger bracket. Specifically, in the illustrated embodiment the hanger bracket is provided with parallel retainer arms for engaging the locking slots of the suspension washer when the washer is placed between the retainer arms during the installation a lighting system component. Inwardly projecting stops on the retainer arms act to hold the hanger bracket to the suspension washer under the weight of the suspended lighting system. The hanger bracket can thereafter simply be disengaged by lifting up on the suspended lighting system component and removing the suspension washer from the hanger bracket.

Another feature of the invention acts to prevent inadvertent lifting or jarring forces from dislodging the hanger bracket from the suspension washer. Depressible leaf spring means on the hanger bracket's retainer arms are operative to snap through the locking slots of the washer so as to prevent substantial sliding movement of the washer on the retainer arms after the washer contacts the projecting stops of the retainer arms. With this feature, disengagement of the hanger bracket from the suspension washer is readily accomplished by simply depressing the leaf spring means prior to sliding the suspension washer from the hanger bracket. However, without depressing the leaf spring these two parts can not be disengaged.

It is contemplated that sets of different sized suspension washers can be supplied to a job site for accommodating a variety of different suspension media. A standardized scheme for anchoring the hanger bracket to the housings of fixture and connector housings is also contemplated, such as providing the fixture housings with extruded "T" slots and/or screw channels and including corresponding attaching hardware such as "T" studs, lock nuts, and tapping screws. With a standard anchoring scheme and a set of suitably sized suspension washers, the hanger assembly of the invention can be versatilely employed to hang a linear fixture element at a variety of suspension points, including suspension points of non-standard spacing, using a minimum of inexpensive and easy to use hardware.

It can therefore be seen that a primary object of the present invention is to provide a universal quick connect hanger assembly which is versatile, cost effective, easy to ship and easy to install. It is also an object of the invention to provide a hanger assembly which involves relatively few parts and is compatible with many existing styles of suspended architectural lighting systems. Still a further objective of the invention is to provide standardized hanger hardware that can be used to install the components of a linear lighting system, regardless of the suspension media used and regardless of the electrical feed configuration (such as straight cord, coiled cord, or lead wires). Yet other objects of the invention will become apparent from the following specification and claims.

DESCRIPTION OF THE DRAWINGS

FIG. 7 is a perspective view of the quick connect hanger assembly of the present invention showing the use of a spacing bracket at the hanger location.

FIG. 8A is a fragmentary top plan view of a lighting fixture and hanger assembly in accordance with the invention showing in further detail means for anchoring the hanger bracket of the assembly to a fixture housing.

FIG. 8B is a fragmentary top plan view of the lighting fixture and hanger assembly shown in FIG. 8A with the spacer bracket removed.

DETAILED DESCRIPTION OF THE ILLUSTRATED EMBODIMENT

Figure 1A:
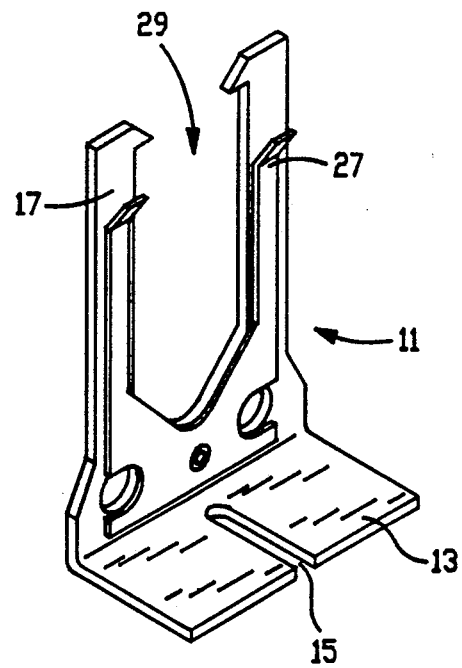
FIG. 1A is a perspective view of the hanger bracket portion of one embodiment of the universal quick connect hanger assembly of the present invention.
Figure 1B:
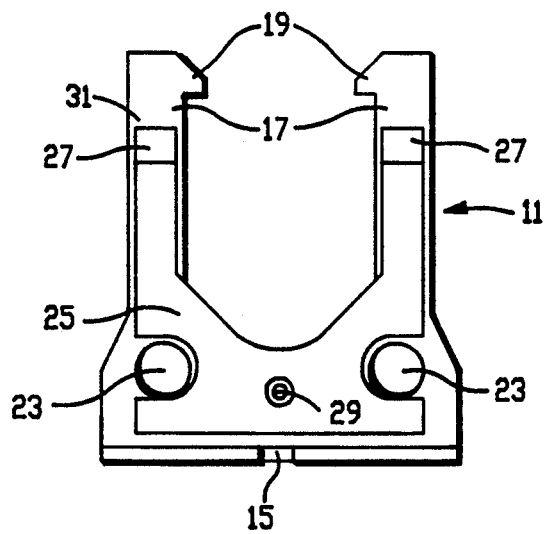
FIG. 1B is a front elevation view thereof.
Figure 1C:
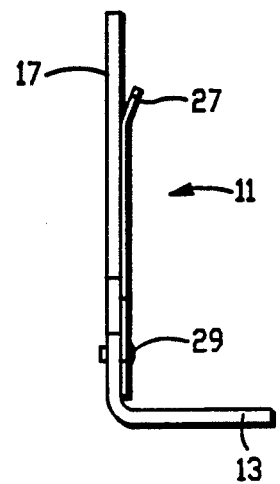
FIG. 1C is a side elevation view thereof.
Figures 2, 2A:
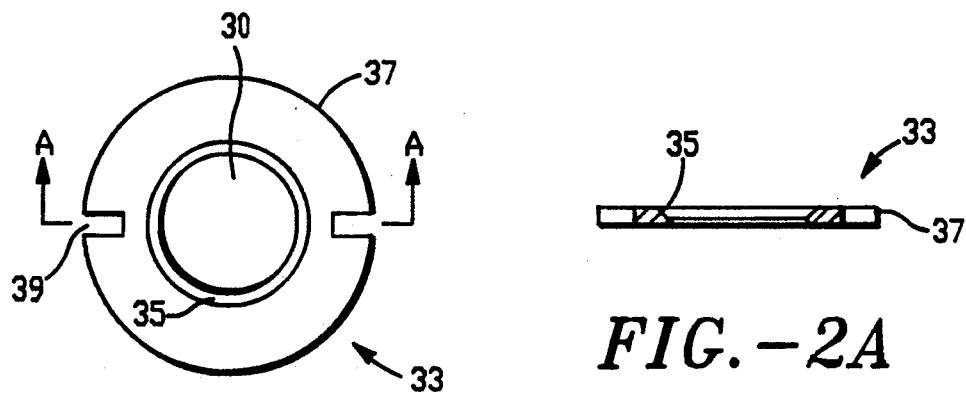
FIG. 2 is a top plan view of one embodiment of the suspension washer of the present invention.
FIG. 2A is a cross-sectional, side elevation view thereof taken along section lines A—A in FIG. 2.

Referring now to the drawings, FIGS. 1 and 2 generally illustrate the two essential parts of the hanger bracket assembly of the invention, namely, a hanger bracket as shown in FIG. 1 and a suspension media adapter as shown in FIG. 2. Referring to FIG. 1, an L-shaped hanger bracket 11, which is preferably made from a stamped metal part, includes an integral base portion 13, an anchor slot 15 formed in the base portion, and upwardly extending, substantially parallel retainer arms 17 at the end of which are formed inwardly projecting stops 19. It is seen that the retainer arms form an U-shaped upper part to the bracket which has a defined channel opening 21 for receiving a suspension washer as hereinafter described. Alignment holes 23 at the bottom of this U-shaped upper part are provided in connection with an anchoring scheme for the hanger bracket discussed below.

An U-shaped leaf spring element 25 having extended leaf spring ends 27 is attached, such as by means of a rivet 29, to the inside surface of the U-shaped portion of the hanger bracket. It is seen that the shape of the leaf spring substantially conforms to the shape of the bracket such that the extended leaf spring ends extend upwardly against the bracket's retainer arms to a point 31 slightly below the inwardly projecting stops 19. As will be described in greater detail, the leaf spring ends will prevent the suspension washer from sliding back down and potentially off of the retainer arms once it is snapped into position against the retainer arm stops.

Figures 3, 3A:
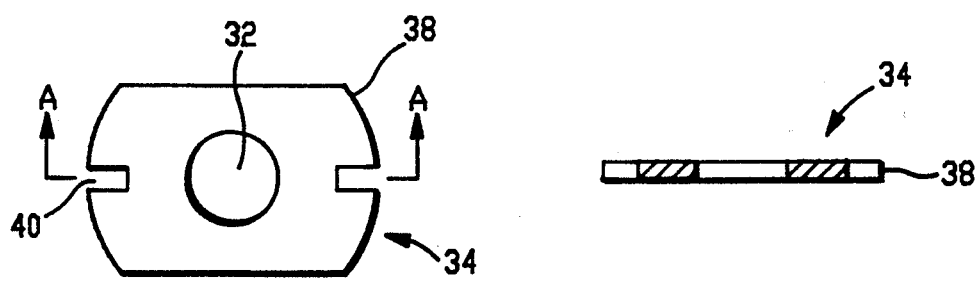
FIG. 3 is a top plan view of another version of the suspension washer of the present invention.
FIG. 3A is a cross-sectional, side elevation view thereof taken along section lines A—A in FIG. 3.

Referring to FIGS. 2 and 3, suspension washers 33, 34 each have a central opening 30, 32 to permit the washers to receive and be threaded over an elongated suspension media. It is noted that in the FIG. 2 embodiment the central opening of the washer also has a beveled edge 35. This embodiment is particularly suitable for use with a swivel stem type suspension media, in that, the beveled edge will act to prevent scoring of the ball end of the stem.

The suspension washers are further shown as having fined perimeters 37, 38 and opposed locking slots 39, 40 formed in their perimeters. The locking slots provide the means by which the retaining arms 17 of the hanger bracket are lockingly engaged to hanger bracket retaining arms. It will readily be understood that to permit the suspension washers to be engaged in the hanger bracket the separation of the retaining arms of the bracket and the washer's perimeter diameter at the locking slots must correspond.

For maximum strength and support, the locking washer will preferably have a completely round outside perimeter as shown in FIG. 2, however, where space considerations are important, the outside perimeter can be flat-sided as illustrated by the FIG. 3 washer. Washers having central openings of different diameters can be used to accommodate the different diameters of various standard suspension media. Each type of suspension media would have its own associated suspension washer and by providing a variety of washers in inexpensive washer sets, the hanger assembly of the invention would become universal to all suspension media.

Figure 4:
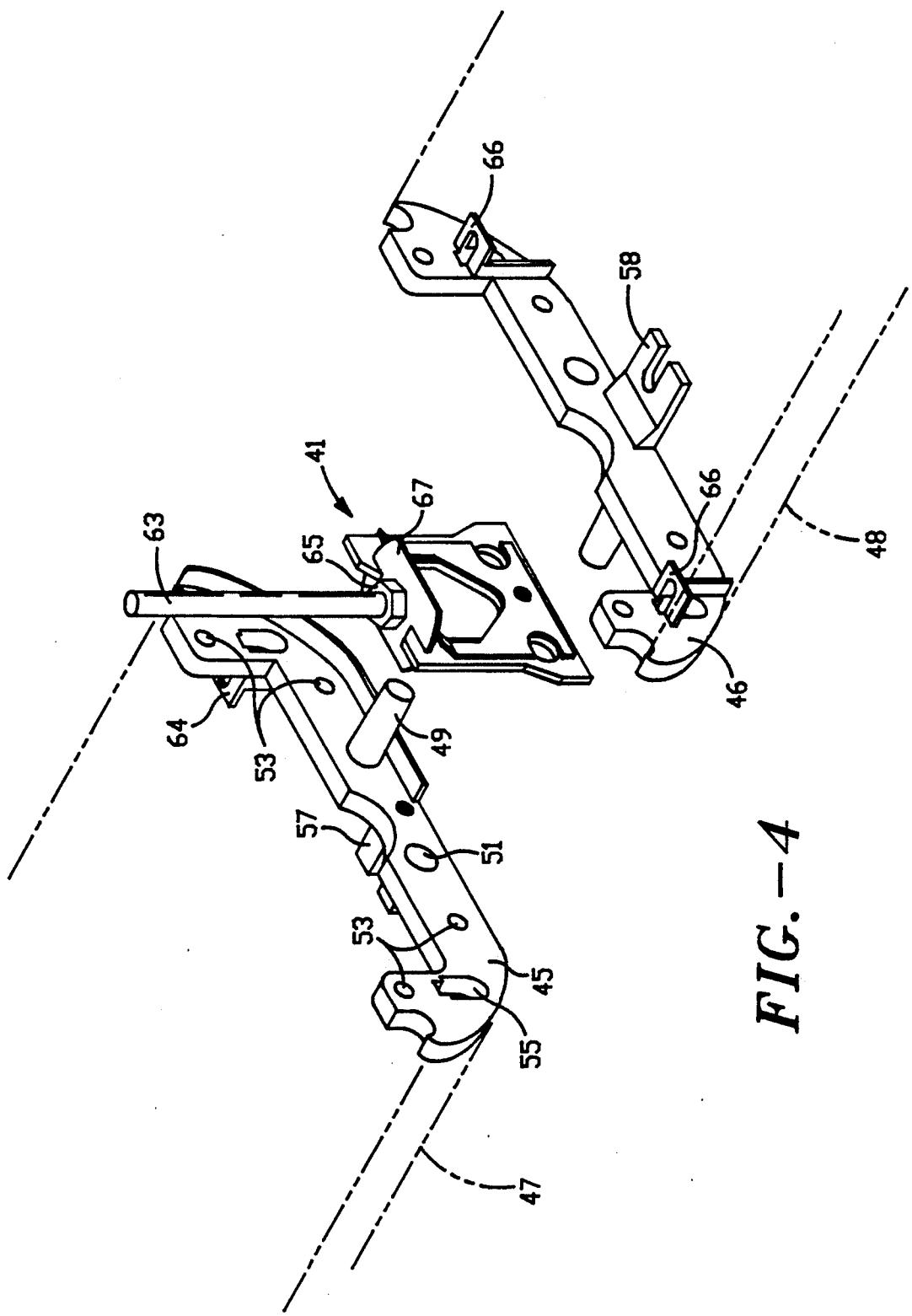
FIG. 4 is a perspective view of a quick connect hanger assembly in accordance with the invention showing the assembly of a straight hanger bracket between two mating joiner plates.

Referring now to FIG. 4, a hanger assembly 41 is shown wherein the hanger bracket 43 of the assembly is anchored between two joiner plates 45, 46 secured to the ends of two linear fixture housings 47, 48 (shown in phantom lines). The hanger bracket of this assembly is identical to the hanger bracket described in FIG. 1, except that the bracket is straight rather than L-shaped and is anchored by means of the joiner plates rather than through the anchor slot of the integral base portion of the hanger.

The joiner plates shown in FIG. 4 are preferably identical cast plates, the shape of which generally conform to the shape of the fixture housing with which the joiner plates are used. Each joiner plate includes an alignment post 49 extending from one side of the plate and offset relative to the center line of the plate; it also includes a correspondingly offset alignment hole 51, and, on either end of the plate, corresponding stud holes 53 and wire pass-through openings 55 which align with each other when the plates are reversed and mated together. Means for anchoring the joiner plates 45, 46 to the fixture housings 47, 48 include a slotted bottom tab 57, 58 and upper tabs 64, 66 projecting rearwardly from each plate to permit the plate to be anchored to both an extruded T-slot 59, 60 in the bottom of the fixture housings and two screw channels 61, 62 extruded along the sides of the housing as shown in FIG. 8 and later described.

As shown in FIG. 4, the joiner plates 45, 46 will anchor the hanger bracket 43 of the hanger assembly when the alignment posts of each joiner plate is inserted through the corresponding alignment hole of the hanger bracket and opposite joiner plate and when the bracket is sandwiched between the joiner plates.

Figure 5:
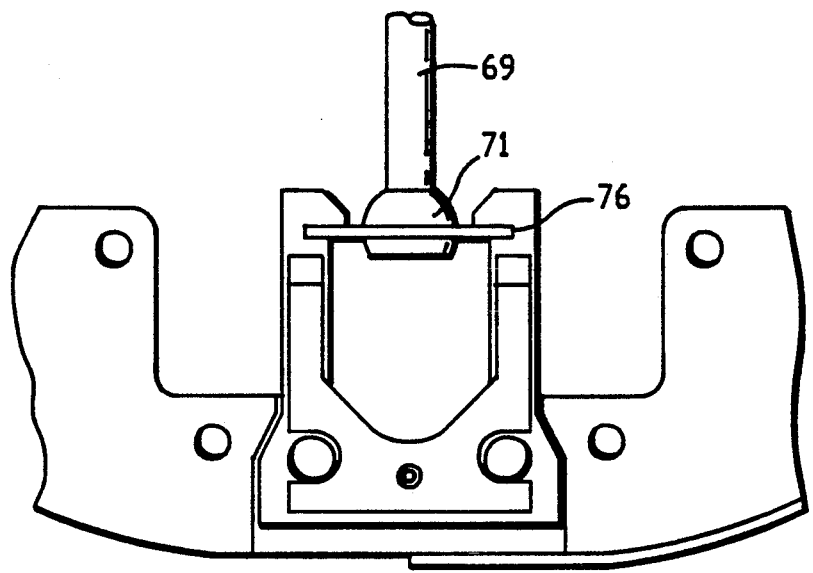
FIG. 5 is a fragmentary, front elevation view of a hanger assembly and joiner plate as shown in FIG. 4, except showing the hanger suspended from a swivel stem type suspension media.
Figure 6:
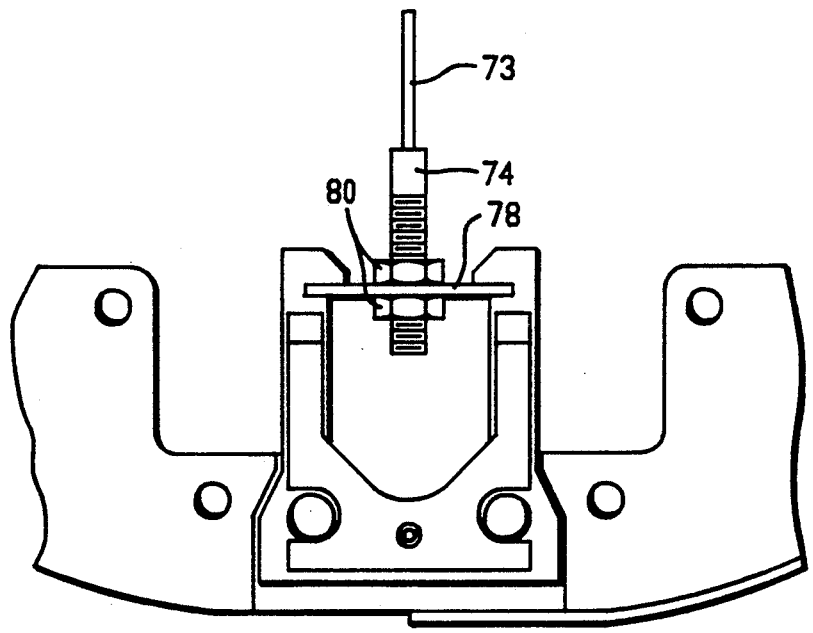
FIG. 6 is a fragmentary, front elevation view of a hanger assembly and joiner plate as shown in FIG. 4, except showing the use of the hanger with a cable-type suspension media.

Use of the hanger assembly of the invention with different types of suspension media is best illustrated in reference to FIGS. 4-6. FIG. 4 shows the use of the hanger assembly with a rigid stem 63 having a threaded end (not shown) which receives two lock nuts, such as the shown top lock nut 65, for holding the suspension washer 67 onto the end of the stem. FIG. 5, on the other hand, shows the hanger assembly used in connection with a swivel stem suspension 69 having a ball end 71, whereas FIG. 6 shows a hanger assembly used with a suspension cable 73 having a threaded stud end 74. A beveled edge suspension washer 76 such as shown in FIG. 2 is preferably used with the swivel stem suspension of FIG. 5, whereas a flat-sided suspension washer 78 as shown in FIG. 3 and which is held in place by lock nuts such as lock nuts 80 shown in FIG. 6, can suitably be used in connection with the rigid stem and cable suspensions shown in both FIGS. 4 and 6.

FIGS. 7 and 8 show a scheme for mounting the hanger assembly of the invention using an U-shaped spacer bracket at the hanging location. In this mounting scheme, an L-shaped hanger bracket 75 of the type shown in FIG. 1 is selected and its slotted base anchored to the center T-slot 77 extruded into the bottom of the fixture housing 79. As best seen in FIG. 8, the bottom wall 81 of the spacer bracket 82 is provided with a slot 83 for accommodating the upwardly extending retainer arms 85 of the hanger bracket. It is seen that the spacer bracket provides room to fit the hanger bracket in the housing between the joiner plate and lamp sockets 86 for lamps 87. The back wall 89 of the spacer bracket also acts to shield the ends of the lamps.

The installation of the hanger assembly as shown in FIG. 7 is best described in reference to FIG. 8. The installation first involves placing a joiner plate 91 in the end of the housing 79 and securing it to both the housing's extruded T-slot 77 by means of a T-slot stud 99 and nut 101. The L-shaped hanger bracket can then be placed over the T-slot between extruded guide ribs 105 and then loosely secured in place by its own T-slot stud 107 and nut 109 as shown in FIG. 8B. The spacer bracket 82 can then be installed as generally shown in FIG. 8A by placing it over the hanger bracket so that the hanger bracket projects through the slot 83. By sliding the spacer and hanger brackets together up against the joiner plate so that the bottom wall of the spacer slides under the upper tabs 98 of the joiner plate, the joiner and spacer brackets can be secured to the housing as a unit by means of tapping screws 100 which tap into the housing screw channels 95, 97. After that the nut holding the hanger bracket can be tightened. Eventually, when the fixture is hung, fixture ends can be butted together such that the alignment post 113 of one joiner plate is inserted through the alignment hole of the opposite joiner plate and such that light shield flanges 115 on the bottom of the joiner plates overlap the joint between fixtures. The ends can then be secured together through the top stud holes of the joiner plates by means of suitable attachment bolts and nuts (not shown). Where the hanger assembly is anchored between the two joiner plates as shown in FIG. 4, the installation is simplified, since all that is required is that the hanger bracket be placed between the joiner plates in alignment with the alignment posts thereof as the fixture ends are butted together. Due to space constraints created by the lamp sockets behind the joiner plates, the FIG. 4 arrangement would normally only be used in connection with two lamp fixtures as opposed to one or three lamp fixtures which have centered lamp sockets.

Figure 9:
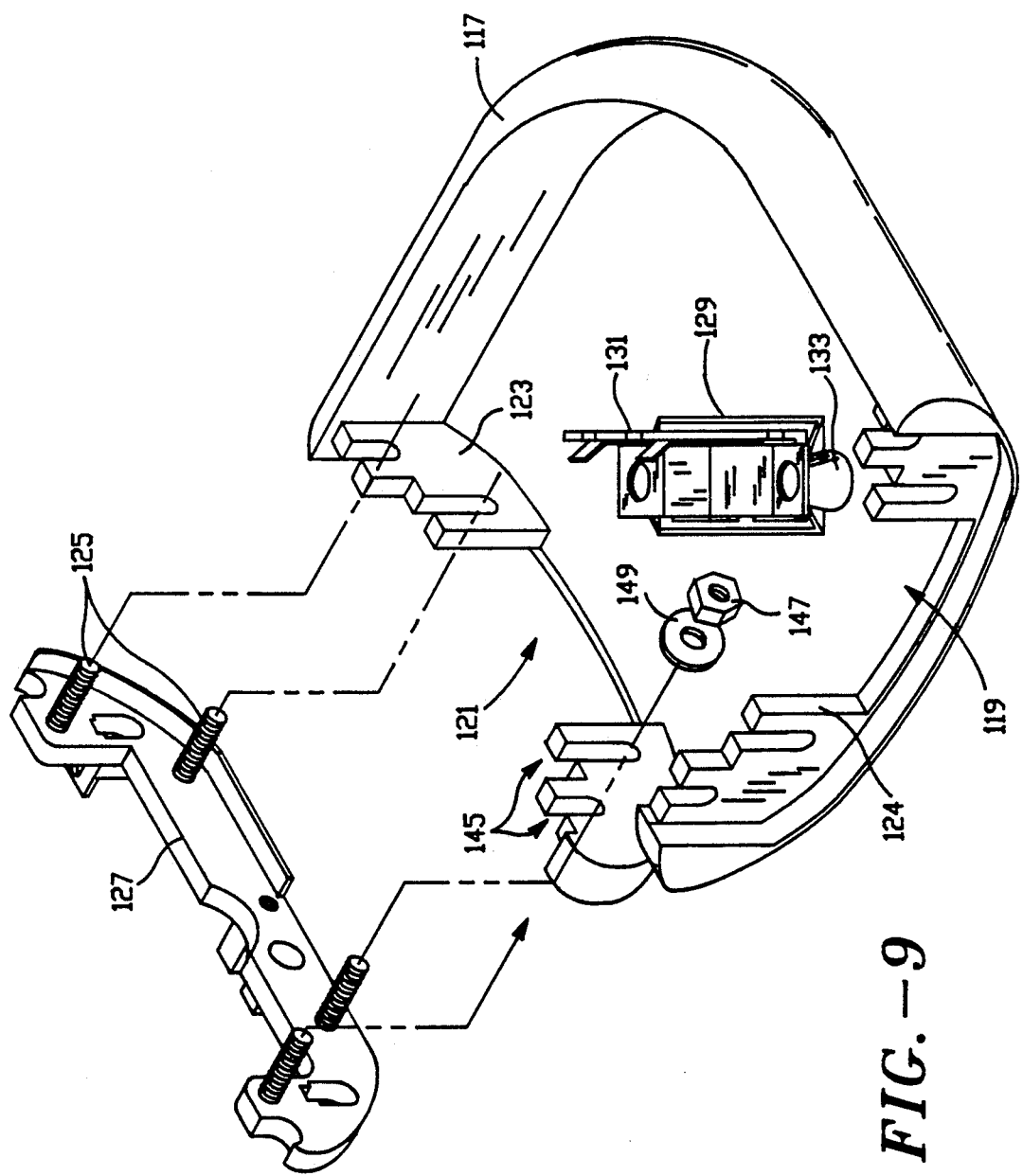
FIG. 9 is a perspective view of a hanger assembly in accordance with the invention anchored to the corner connector of a lighting system.
Figure 10:
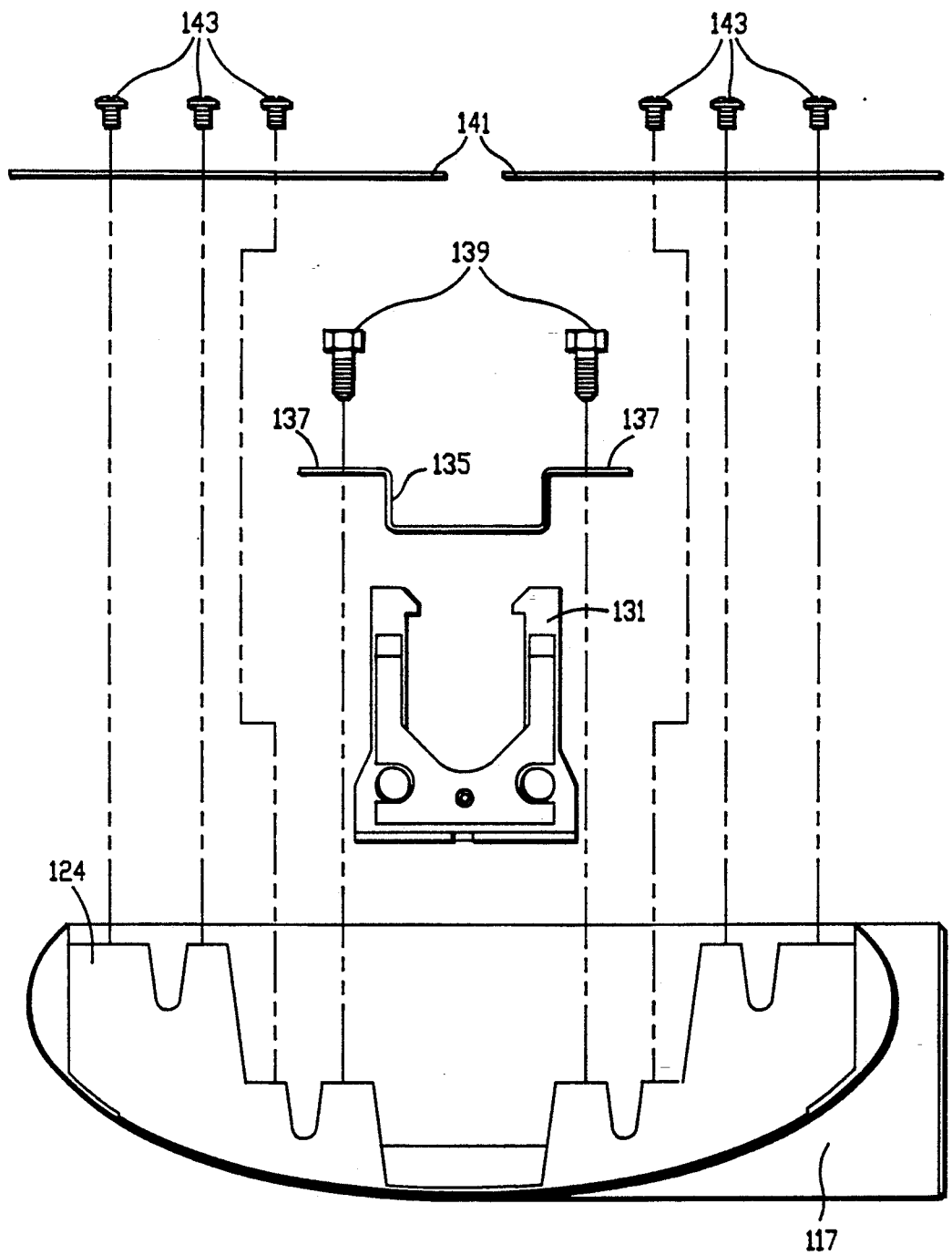
FIG. 10 is an assembly view further showing the installation of a hanger assembly in the corner connector shown in FIG. 9.
Figure 11:
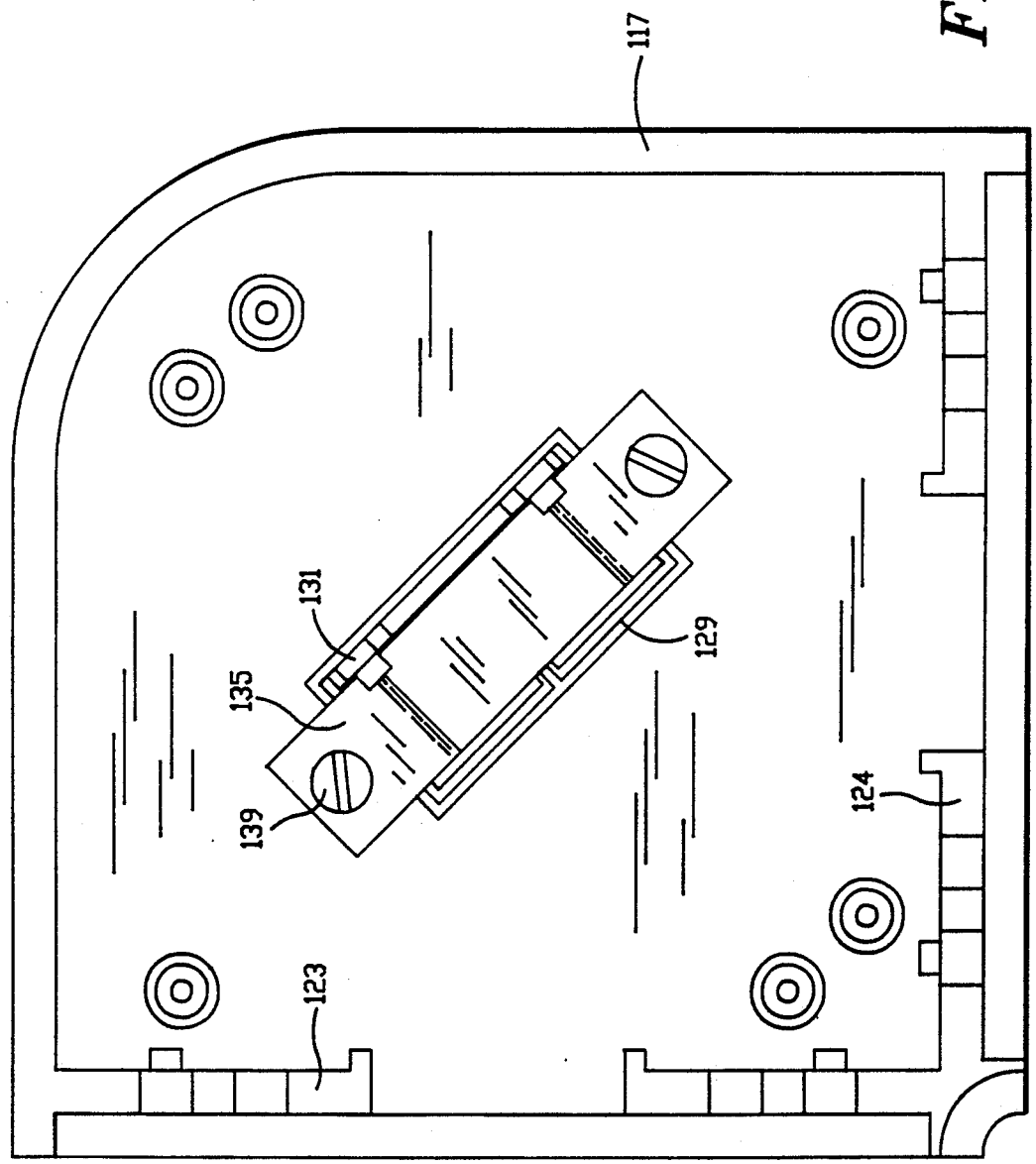
FIG. 11 is a top plan view of the corner connector and hanger assembly shown in FIG. 9.

Use of the hanger assembly of the invention with connector components of a linear lighting system, such as a L-corner connector, is shown in FIGS. 9-11. The corner connector includes a cast housing 117 having two 90° open connector ends 119, 121, and a notched wall 123, 124 spanning each of the connector ends for receiving threaded studs 125 of a fixture end plate 127. The housing further includes a cast footing 129 for receiving the base portion of an L-shaped hanger bracket 131 of the type shown in FIG. 1, and two cast screw posts 133 for holding a U-shaped hanger bracket retaining strap 135. As best illustrated by the FIG. 10 assembly drawing, the hanger bracket is installed into the cast housing of the corner connector by placing the hanger bracket in the housing footing and installing the strap over the base portion of the bracket by screwing the ends 137, of the strap to the screw posts 133 by means of mounting screws 139. Cover plates 141 can additionally be installed by means of mounting screws 143 over the top of the corner connector housing to cover internal wiring.

It is contemplated that the installation of a linear lighting system using the quick connect hanger assembly of the present invention will involve first hanging connector elements, such as the corner connector illustrated in FIGS. 9-11, and/or a starter linear fixture element and then hanging the ends of the remaining linear fixtures elements successively from the open connector ends of the hung fixtures and connectors. For example, the end of a linear fixture element can be hung from a connector end 119 of the corner connector shown in FIGS. 9-11 by simply cradling the studs 125 projecting from the end plate 127 of the lighting fixture into the corresponding notches 145 of the notched wall 124 and securing the fixture by mounting nuts and washers such as the nut 147 and washer 149 shown in FIG. 9. It can be noted that the end plate 127 shown in FIG. 9 is identical to the joiner plates shown in FIGS. 4 and 71 except that the alignment pin has been removed. The end plates can be fabricated by simply grinding off the alignment posts and installing threaded studs in the stud holes of the joiner plates.

Therefore it can be seen that the present invention provides a versatile quick connector hanger assembly for suspending a lighting system, and particularly a linear lighting system, from an overhead ceiling. The invention provides hanger hardware that can be used with all standard forms of suspension media, and provides for ease of installation with a minimum number of parts. Although the invention has been described in considerable detail in the foregoing specification, it shall be understood that it is not intended that the invention be limited to such detail, except as necessitated by the following claims.

What we claim is:

1. A universal quick connect hanger assembly for suspending a lighting system from an overhead structure by means of suspension media comprising a suspension washer having a perimeter, generally radial locking slots formed in said perimeter, and a center opening formed to receive suspension media of the type used to suspend said lighting system such that said washer will be retained on the end of the suspension media, and a hanger bracket for said suspension washer including means for anchoring said hanger bracket to an element of a lighting system to be suspended, said hanger bracket having upwardly extending substantially parallel retainer arms spaced apart and formed to slidably engage in the locking slots of said suspension washer when said washer is placed between said retainer arms, said retainer arms having opposed inwardly projecting stops which, under the weight of a suspended lighting system, contacts and seat on said suspension washer when said washer is engaged on said retainer arms.

2. The universal quick connect hanger assembly of claim 1 further comprising depressible leaf spring means on at least one of the retainer arms of said hanger bracket, said leaf spring means being operative to snap through the locking slots of said suspension washer so as to prevent substantial sliding movement of said washer on said retainer arms after said washer contacts the projecting stops of said retainer arms.

3. The universal quick connect hanger assembly of claim 1 wherein said hanger bracket is an L-shaped bracket having a base portion and a mounting slot in said base portion to provide means for anchoring said bracket to the housing of a lighting system to be suspended.

4. The universal quick connect hanger assembly of claim 1 wherein said hanger bracket is a planar bracket adapted to fit against and be retained by at least one vertical plate member of a lighting system to be suspended.

5. The universal quick connect hanger assembly of claim 1 wherein a set of at least three different types of suspension washers are provided, including one adapted to be retained on the end of cable type suspension media, one adapted to be retained on the end of a rigid stem type suspension media, and one adapted to be retained on the end of a swival stem type suspension media.

6. The universal quick connect hanger assembly of claim 1 wherein a suspension washer is provided which is adapted to be retained on the end of a ball aligner stem type suspension media having a ball end, the center opening of said washer having a bevelled edge for contacting the ball end of the ball aligner stem type suspension system.

7. A universal quick connect hanger assembly for suspending a lighting system from an overhead structure such as a ceiling by means of suspension media comprising a suspension washer having a perimeter, locking slots formed in said perimeter, and a center opening formed to receive suspension media of the type used to suspend said lighting system such that said washer will be retained on the end of the suspension media, a hanger bracket for said suspension washer including means for anchoring said hanger bracket to an element of a lighting system to be suspended, said hanger bracket being comprised of a U-shaped planar bracket portion having defined upwardly extending substantially parallel retainer arms spaced apart and formed to slidably engage in the locking slots of said suspension washer when said washer is placed between said retainer arms, said retainer arms having opposed inwardly projecting stops which, under the weight of a suspended lighting system, contacts and seat on said suspension washer when said washer is engaged on said retainer arms, and depressible leaf spring means on at least one of the retainer arms of said hanger bracket, said leaf spring means being operative to snap through the locking slots of said suspension washer so as to prevent substantial sliding movement of said washer on said retainer arms after said washer contacts the projecting stops of said retainer arms.

8. The universal quick connect hanger assembly of claim 7 wherein said leaf spring means includes a U-shaped leaf spring element having defined upwardly extending substantially parallel leaf spring ends, said leaf spring element being affixed to one side of the U-shaped planar bracket portion of said hanger bracket such that said leaf spring ends extend upwardly against the retainer arms thereof.

9. A universal quick connect hanger assembly system for suspending a lighting system from an overhead structure such as a ceiling by means of suspension media comprising a suspension washer having a perimeter, locking slots formed in said perimeter, and a center opening formed to receive suspension media of the type used to suspend said lighting system such that said washer will be retained on the end of the suspension media, a U-shaped planar hanger bracket having a base portion, anchor holes in said base portion, and defined upwardly extending substantially parallel retainer arms spaced apart and formed to slidably engage in the locking slots of said suspension washer when said washer is placed between said retainer arms, said retainer arms having opposed inwardly projecting stops which, under the weight of a suspended lighting system, contacts and seat on said suspension washer when said washer is engaged on said retainer arms, and a pair of mating vertical joiner plates having mating attachment means which extend from one joiner plate to the other joiner plate to hold said pair of joiner plates together, said mating attachment means being disposed to extend through the anchor holes in the base portion of said hanger bracket such that said hanger bracket can be sandwiched between said vertical joiner plates and anchored thereby.

10. The universal quick connect hanger assembly system of claim 9 wherein said vertical joiner plates are identically formed parts which when reversed join together by said mating attachment means.

11. The universal quick connect hanger assembly system of claim 10 wherein the mating attachment means of said joiner plates includes a dowel pin and dowel hole on each joiner plate which mate with the dowel pin and dowel hole of the other joiner plate through correspondingly placed anchor holes in the base portion of said hanger bracket.

* * * * *